US011863610B2

(12) United States Patent
Bogrett et al.

(10) Patent No.: US 11,863,610 B2
(45) Date of Patent: Jan. 2, 2024

(54) TRANSACTION MANAGEMENT OF MULTIPLE NETWORKED RESOURCES

(71) Applicant: XACTLY CORPORATION, Los Gatos, CA (US)

(72) Inventors: Steven Bogrett, Los Gatos, CA (US); Oleksandr Podoprygora, Dublin, CA (US)

(73) Assignee: Xactly Corporation, Los Gatos, CA (US)

( * ) Notice: Subject to any disclaimer, the term of this patent is extended or adjusted under 35 U.S.C. 154(b) by 0 days.

(21) Appl. No.: 17/743,066

(22) Filed: May 12, 2022

(65) Prior Publication Data

US 2023/0370517 A1    Nov. 16, 2023

(51) Int. Cl.
*H04L 67/02* (2022.01)
*H04L 67/1097* (2022.01)
*G06F 16/27* (2019.01)
*G06F 11/14* (2006.01)
*H04L 67/561* (2022.01)

(52) U.S. Cl.
CPC .......... *H04L 67/02* (2013.01); *G06F 11/1471* (2013.01); *G06F 16/27* (2019.01); *H04L 67/1097* (2013.01); *H04L 67/561* (2022.05); *G06F 2201/80* (2013.01)

(58) Field of Classification Search
CPC ... H04L 67/02; H04L 67/561; H04L 67/1097; G06F 16/27; G06F 11/1471; G06F 2201/80
See application file for complete search history.

(56) References Cited

U.S. PATENT DOCUMENTS

| 6,314,430 B1 * | 11/2001 | Chang | G06F 16/289 |
| | | | 707/999.102 |
| 10,929,428 B1 * | 2/2021 | Brahmadesam | G06F 16/2379 |
| 2009/0199210 A1 * | 8/2009 | Smith, Jr. | H04L 67/02 |
| | | | 719/315 |
| 2014/0032964 A1 * | 1/2014 | Neerincx | H04L 69/40 |
| | | | 707/634 |

(Continued)

*Primary Examiner* — Viet D Vu
(74) *Attorney, Agent, or Firm* — Baker Botts L.L.P.

(57) ABSTRACT

A method for managing multiple REST requests of a browser or other client to resources in an atomic transaction using a transaction management process that is communicatively coupled to a cluster of computer-executed server processes. In one approach, the process is programmed for receiving from a browser process a request to start a transaction associated with a data access process; acquiring a database connection from the data access process and storing the database connection in an open state; receiving from the browser process REST queries for execution; forwarding the REST queries to the data access process, and forwarding responses from the data access process to the browser process; receiving a request from the browser process to end the transaction, and only in response to the second request, completing the transaction in communication with the data access process, and changing the database connection to a closed state. As the connection to the database remains open, multiple REST queries may be sent for updating multiple resources in a single transaction efficiently through the same data access process without occupying extra server processes.

12 Claims, 5 Drawing Sheets

(56) References Cited

U.S. PATENT DOCUMENTS

| | | | |
|---|---|---|---|
| 2015/0365551 A1* | 12/2015 | Panuganti | H04N 1/00503 358/1.15 |
| 2017/0180513 A1* | 6/2017 | Doyle | G06Q 20/12 |
| 2020/0409949 A1* | 12/2020 | Saxena | G06F 9/505 |
| 2021/0328972 A1* | 10/2021 | Ionescu | H04L 63/0281 |

* cited by examiner

TRANSACTION MANAGEMENT OF MULTIPLE NETWORKED RESOURCES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2022 Xactly Corporation.

FIELD OF THE DISCLOSURE

One technical field of the present disclosure is computer-implemented methods of managing application programming interface (API) transactions. Another technical field is methods implemented in stored programs for managing representational state transfer (REST) transactions concerning multiple REST resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Representational state transfer (REST) is an application programming interface (API) protocol that is widely used in web service development for its flexibility and easy-to-implement architecture style. In a typical implementation, a client program transmits a REST query to a server process to start a transaction associated with a particular query and receives a response from the server. Responses can be formatted, for example, JSON data format, XML data format, or HyperText Markup Language (HTML) pages transmitted over the Hypertext Transfer Protocol (HTTP). Depending on whether the request can be served, the REST query is committed or rolled back. Thus, a transaction of a single REST query in this model is atomic.

However, some applications or programming environments require the ability to execute multiple REST queries for various operations on REST resources that are associated with a single transaction. Example contexts include the need to reduce server traffic, to minimally occupy server resources and to improve the efficiency of updating multiple REST resources.

In one approach, a software program implements methods of managing a single transaction with multiple REST resources by defining a larger resource which includes all the resources that need updating by a client. Another approach is to implement a distributed transactions manager, in which a backend transaction manager is communicatively coupled to a frontend transaction manager. These approaches require implementing a new server to manage operations with multiple resources and require additional endpoints for processing the multiple REST queries. None operates purely at the client and the operations at the server level cannot interoperate with existing endpoint processing such as intercepting, delegating, or proxying without adding a new server.

SUMMARY

The appended claims may serve as a summary of the invention.

DETAILED DESCRIPTION

In the following description, numerous specific details are stated to provide a thorough understanding of the present invention and to describe clear examples. It will be apparent, however, that the present invention may be practiced without these specific details. In other instances, well-known structures and devices are shown in block diagram form to avoid unnecessarily obscuring the present invention. Embodiments are described in sections below according to the following outline:
 1. General Overview
 2. Structural Overview of an Example Embodiment
 3. Functional Overview of an Example Embodiment
 4. Implementation Example—Hardware Overview 1. General Overview In one embodiment, a computer-implemented method of transaction management of multiple resources comprises a client declaring the starting of a transaction that is associated with multiple resources, executing multiple REST queries within the single transaction, and declaring an ending of the transaction. A transaction management process receives the declaration of a start of a transaction and independently manages acquiring a database connection, tracking which queries are associated with a transaction, locally executing or proxying queries depending on the location of endpoints, and committing or rolling back queries to the database. One or more server processes supply and release database connections and execute REST queries. Embodiments provide the key benefits of removing the need for clients to instantiate and manage additional servers for executing multiple REST queries while allowing clients to efficiently update multiple REST resources in one transaction. Implementation cost is minimal, typically adding one network hop to the end-to-end process.

In an embodiment, a computer-implemented method comprises, using a transaction management process that is communicatively coupled to a cluster of computer-executed server processes, receiving from a browser process a first request to start a transaction associated with a data access process, acquiring a database connection from the data access process and storing the database connection in an open state, receiving from the browser process multiple REST queries for execution, programmatically forwarding multiple REST queries to the data access process and programmatically forwarding responses from the data access process to the browser process, receiving a second request from the browser process to end the transaction, and only in response to the second request, programmatically completing the transaction in communication with the data access process, and changing the database connection to a closed state.

In an embodiment, the method further comprises generating and storing a unique transaction identifier for the transaction in association with storing the database connection of the data access process. The database connection may be associated with a server node at which the first request of the transaction arrives, and the transaction management process may be programmed to keep the transaction open until a second request to end the transaction is received. In an embodiment, each of the multiple REST queries sent by the browser process comprises a particular transaction identifier, which the transaction management process can use to associate the query with an open transaction.

In an embodiment, a process of forwarding multiple REST queries further comprises determining whether the unique transaction identifier of the transaction associated with a data access process matches the particular transaction identifier. The data access process can manage a server node. When the particular transaction identifier of the particular REST query among the plurality of REST queries matches the unique transaction identifier, then the transaction management process forwards that particular REST query to the data access process for execution by the server node. When the particular transaction identifier of the particular REST query among the plurality of REST queries does not match the unique transaction identifier, then the transaction management process is programmed to proxy that particular REST query to a different particular server process among a cluster of computer-executed server processes.

The term "data access process" can refer, in an embodiment, to a particular process executed by a particular server among a cluster of servers that is communicatively coupled to one or more client terminals for example browsers, and communicatively coupled to one or more databases. The data access process provides access to a server node that implements a REST service and can be communicatively coupled to a database. The data access process can implement multiple REST resources each of which is capable of invocation via queries.

In this manner, the methods and systems of the disclosure do not require using container-managed transactions, since only a single transaction management process and a single server process are needed to execute multiple REST queries operations with existing REST endpoints. Furthermore, the methods and systems of the disclosure do not require clients to manage committing and rolling back operations for multiple REST queries as an atomic transaction.

Additional aspects and features of embodiments will be apparent from the description herein in other sections.

2. Structural Overview of an Example Emodiment

Figure 1:
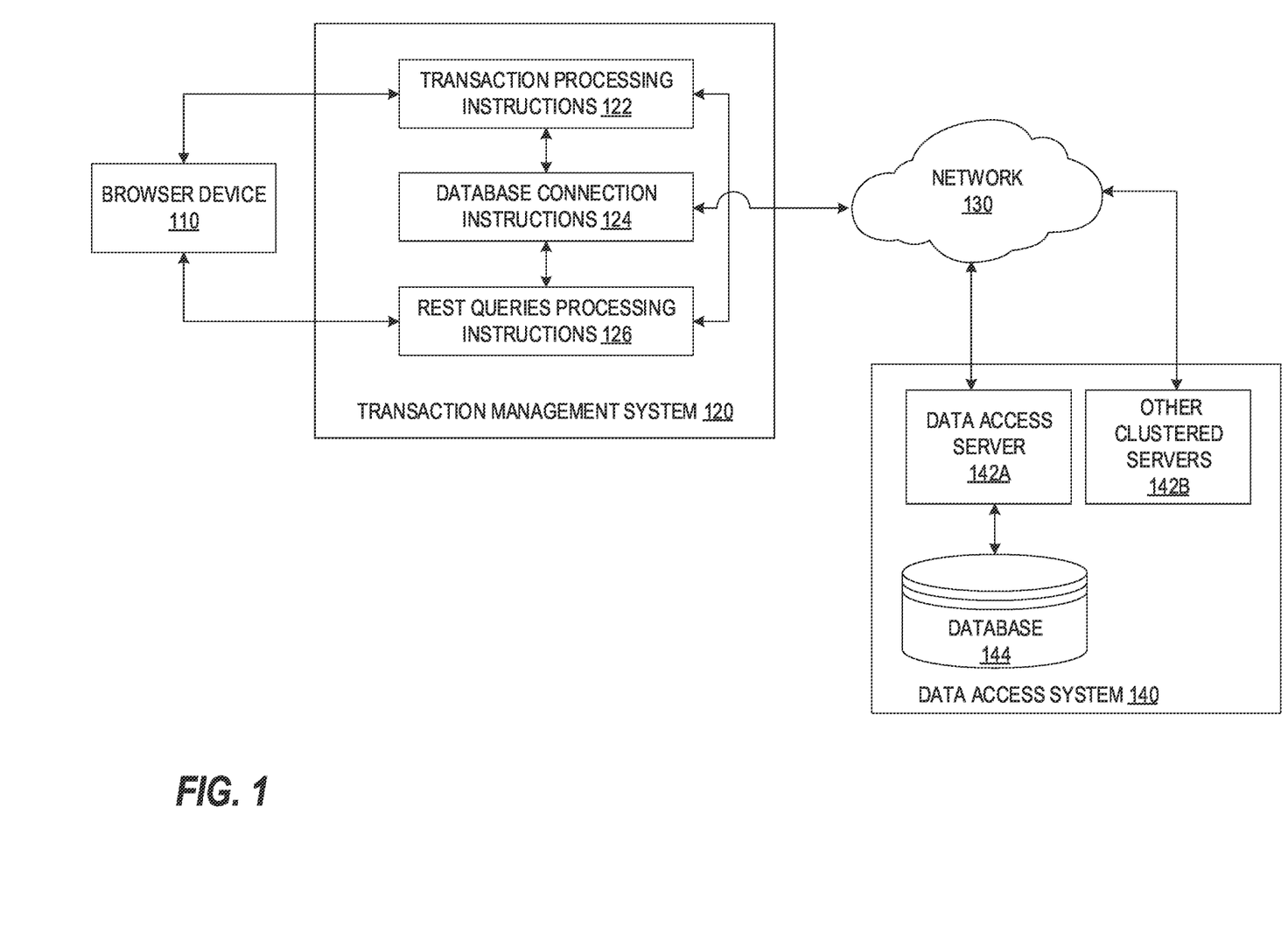
FIG. 1 is a block diagram that illustrates an example distributed computing system with which an embodiment may be implemented.

FIG. 1 is a block diagram that illustrates an example distributed computing system with which an embodiment may be implemented. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a distributed computer system can comprise a browser device 110, a transaction management system 120, a network 130, and a data access system 140. Other embodiments can use different architectures to implement the functions that are described in other sections herein and the specific architecture of FIG. 1 is not required in all embodiments.

Browser device 110 can comprise an end station computing device such as a desktop computer, workstation, laptop computer, or mobile computing device, executing an operating system, one or more application programs, and an internet browser. Or, browser device 110 may broadly represent any computing process, stored program, or computing system that is configured to generate and transmit REST requests and queries to the transaction management system 120. Requests and queries can originate from an application program or browser executing at browser device 110 and the particular point of origin is not critical in an embodiment. Although only one browser device 110 is illustrated in FIG. 1 to show a clear example, other practical embodiments may include any number of browser devices.

Browser device 110 is communicatively coupled directly or indirectly to transaction management device system 120 and can be communicatively coupled via network 130 or other links. In an embodiment, transaction management system 120 is communicatively coupled to data access system 140 directly or indirectly via one or more networks 130. Network 130 broadly represents one or more digital data communication networks and may comprise any combination of local area networks, wide area networks, campus networks, or internetworks using any of wired or wireless, terrestrial, or satellite data communication links.

In one embodiment, the transaction management system 120 may be implemented at or integrated with the same computing device as the browser device 110. The Transaction management system 120 is specially programmed with transaction processing instructions 122, database connection instructions 124, and REST queries processing instructions 126. Each of the transaction processing instructions 122, database connections instructions 124, and REST queries processing instructions 126 comprises one or more one or more sequences of executable program instructions that are arranged and programmed to cause one or more processors of the transaction management system 120 to execute the functions that are further described herein in other sections concerning FIG. 2, FIG. 3, and FIG. 4.

In an embodiment, transaction processing instructions 122 are programmed to receive REST requests and queries from browser device 110. The transaction processing instructions 122 are programmed to communicate with the data connection instructions 124 and REST queries processing instructions 126 to determine transaction status, data connection status, and the status of executing REST queries, among other functions.

In an embodiment, database connection instructions 124 are programmed to acquire a database connection from data access system 140 via network 130 and store the database connection in an open state. The database connection instructions 124 are programmed to communicate with transaction processing instructions 122 and REST queries processing instructions 126 to determine transaction status, data connection status, and the status of executing REST queries, among other functions.

In an embodiment, REST queries processing instructions 126 are programmed to execute or cause the execution of REST queries and to determine whether REST queries received from browser device 110 have been executed. In some embodiments, REST queries processing instructions 126 are programmed to forward the REST queries to data access system 140 and to forward responses from data access system 140 to the browser device 110. In some embodiments, REST queries processing instructions 126 are programmed to communicate with transaction processing instructions 122 and data connection instructions 124 to determine transaction status, data connection status, and the status of executing REST queries, among other functions.

In an embodiment, execution of instructions 122, 124, 126 results in the transaction management system 120 receiving a start transaction request from browser device 100, acquiring a database connection from data access system 140 through network 130, storing database connection from data access system 140 through network 130, forwarding multiple REST queries from browser device 100 to data access system 140, forwarding multiple REST queries responses from data access system 140 to browser device 100, receiving an end transaction REST request from browser device 100, and closing the database connection from data access system 140 via network 130. In this manner, embodiments can be programmed to solve the technical problem of how to efficiently execute multiple REST queries within a single transaction and how to avoid making transaction management a burden to client processes.

Data access system 140 may comprise one or more server computers or server processes arranged in a cluster, such as data access server 142A and other servers 142B. Each of the clustered servers can be programmed or configured to access database 144. In some embodiments, a single shared database 144 is used and other embodiments may use multiple shared databases.

The data access server 142A is programmed or configured to generate responses to a first request to start a transaction and to a later request to terminate a transaction, and to generate responses to one or more REST queries that the browser device 120 originates. In some embodiments, database connection instructions 124 of transaction management system 120 may be programmed to acquire a connection to database 144 or to store connection to database 144 at data access server 142A. Responses to the multiple REST queries sent by the browser device 120 may be generated at the same access server 142A where the connection to database 144 is acquired and stored.

Similarly, other embodiments may include more than one database 144. Although server 142A is illustrated as communicatively coupled to the transaction management system 120 and database 144, other embodiments may include one or more other clustered servers 142B being communicatively coupled to the transaction management system 120 and database 144. Data process server 142A is one of the clustered servers in one embodiment.

3. Functional Overview of an Example Embodiment

Figure 2:
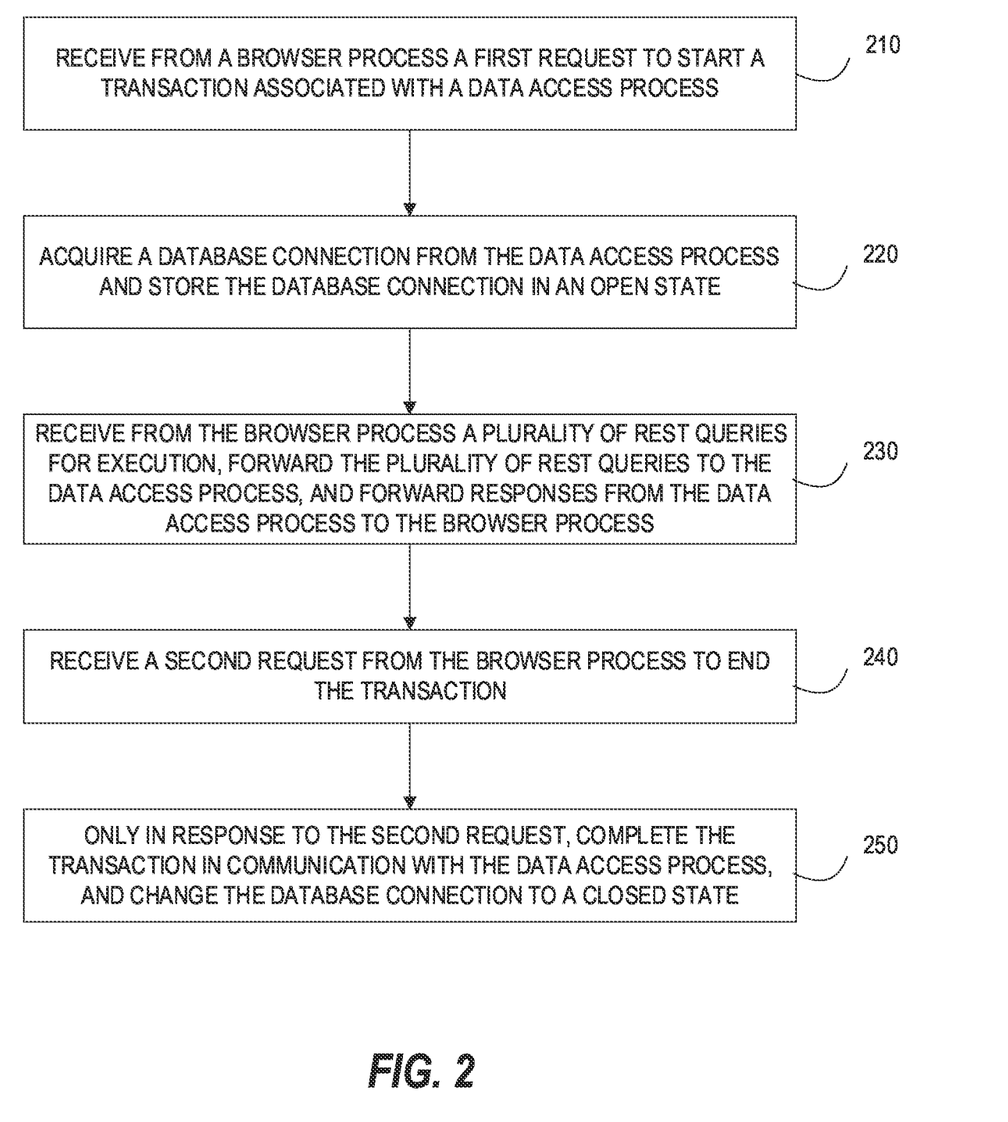
FIG. 2 is a flow diagram that illustrates a process for executing multiple REST queries within one transaction, in an embodiment.

FIG. 2 is a flow diagram that illustrates a process for executing multiple REST queries within one transaction, in an embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In general, in an embodiment, a browser process initiates a transaction to cause the execution of multiple REST queries to be processed by the transaction management system. In an embodiment, the transaction management system is programmed to generate a unique transaction identifier for the transaction, for later use to determine whether each of the multiple REST queries sent by the browser process is associated with the same transaction and can be executed via the same data access process and/or the same local server node that is associated with a database connection.

Referring first to block 210, in an embodiment, the process of FIG. 2 is programmed to receive a first REST request from a browser process to start a transaction associated with a data access process. For example, browser device 110 transmits a request to initiate a transaction to the transaction management system 120 (FIG. 1). In some embodiments, the data access process implements REST resources and is communicatively coupled to a database; the data access process typically implements multiple REST resources that are capable of invocation via queries.

In one embodiment, the browser process may implement an additional REST resource corresponding to a transaction that defines changes to the transaction such as starting and ending the transaction. TABLE A is an example definition process that may be used to define the transaction REST resource under the SPRING BOOT environment. SPRING is a popular Java application framework and SPRING BOOT is a facility to help developers create stand-alone, production-grade SPRING-based applications with less effort.

The example code shown in TABLE A, as well as in TABLE B, TABLE C, TABLE D, and TABLE E as described in other sections, are provided solely to illustrate clear examples of the application of the principles of this disclosure and not to limit the scope of the appended claims to these particular examples. In other embodiments, alternative Java REST API frameworks may be used to implement the functions of the transaction management library.

TABLE A

Transaction Resource Definition Library Code Example

```
@Configuration
@Component Scan({"com.xactly.rest.transaction.manager.rest"})
public class RestConfig {
# create transaction
$ curl http://127.0.0.1:8080/transactions -X "POST" -v
*   Trying 127.0.0.1...
* TCP_NODELAY set
* Connected to 127.0.0.1 (127.0.0.1) port 8080 (#0)
> POST /transactions HTTP/1.1
> Host: 127.0.0.1:8080
> User-Agent: curl/7.64.1
> Accept: */*
>
< HTTP/1.1 201
< Location: http://127.0.0.1:8080/transactions/127.0.0.1-3
< Content-Length: 0
< Date: Fri, 07 May 2021 19:00:46 GMT
<
```

TABLE A-continued

Transaction Resource Definition Library Code Example

```
* Connection #0 to host 127.0.0.1 left intact
* Closing connection 0
# commit transaction
$ curl http://127.0.0.1:8080/transactions/127.0.0.1-3 -X "DELETE"
-d "COMMIT" -H "Content-Type: text/plain" -v
*   Trying 127.0.0.1. . .
* TCP_NODELAY set
* Connected to 127.0.0.1 (127.0.0.1) port 8080 (#0)
> DELETE /transactions/127.0.0.1-3 HTTP/1.1
> Host: 127.0.0.1:8080
> User-Agent: curl/7.64.1
> Accept: */*
> Content-Type: text/plain
> Content-Length: 6
>
* upload completely sent off: 6 out of 6 bytes
< HTTP/1.1 204
< Date: Fri, 07 May 2021 18:59:40 GMT
<
* Connection #0 to host 127.0.0.1 left intact
* Closing connection 0
```

In TABLE A, a transaction REST resource is as TransactionResource.class; and is imported using the SPRING annotation @ComponentScan.

At block 220, the process is programmed to acquire a database connection from the data access process and to store the database connection in an open state. In an embodiment, the transaction management process 120 is programmed to programmatically request data access process 140 to provide a database connection and to store, in main memory, state data identifying the database connection. The data access process can be configured to execute as a particular server process among a cluster of computer-executed server processes.

At block 230, the process is programmed to receive from the browser process a plurality of REST queries for execution, to programmatically forward the plurality of REST queries to the data access process, and to programmatically forward responses from the data access process to the browser process. The transaction management process 120 can be programmed to execute block 230. For example, once the database connection is established and while the database connection remains in an open state, the browser device 110 sends multiple REST queries associated with updating multiple resources to the transaction management process 120 for processing. The transaction management process 120 forwards the multiple REST queries to data access process 140 for execution using the same server that established the database connection. The transaction management process 120 also receives responses from the same server and forwards the responses to the browser device 110.

At block 240, the process is programmed to receive a second request from the browser process to end the transaction. The transaction management process 120 can be programmed to execute block 240. The second request can be a REST request that is formatted for making changes to the transaction resource that was established via the first REST request, as defined in TABLE A.

At block 250, the process is programmed to execute, only in response to the second REST request, to programmatically complete the transaction in communication with the data access process and to change the database connection to a closed state. Completion, in this context, can involve instructing a commit or rollback. The transaction management process 140 can be programmed to execute block 250. In one embodiment, the transaction management process maintains a database connection in the open state, forwards REST queries from the browser process to the data access process and its server for processing, and forwards responses from the server to the browser process. The transaction management process repeats these steps until it receives a request to end the transaction. In response, the transaction associated with the server and database connection is either committed or rolled back, the transaction management process subsequently closes the database connection.

Using the process of FIG. 2, a browser process or other client can transmit a plurality of different REST requests, all of which the transaction management process manages as an atomic transaction, after acquiring a database connection via a data access process that manages both a database and a server to execute the REST requests. The browser process or other client signals that start and end of a transaction. In response to a request signaling the end of a transaction that involved multiple REST queries, the transaction management process can commit or roll back all the requests in communication with the data access process.

Figure 3:
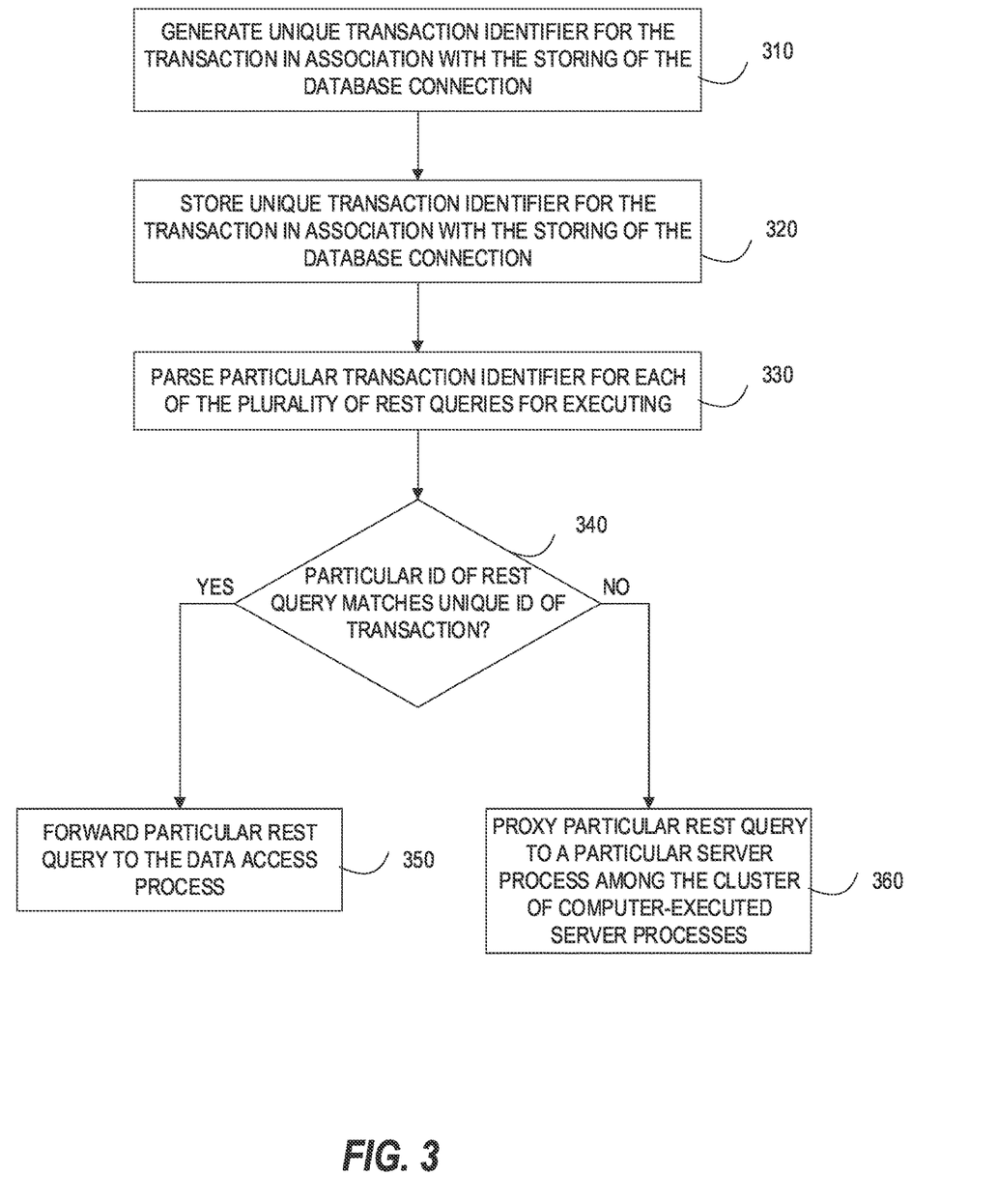
FIG. 3 is a flow diagram that illustrates a process for generating and storing a unique transaction identifier for the transaction in association with the storing of the database connection, in an embodiment.

In some embodiments, the transaction management process uses a unique transaction identifier to associate incoming client requests with existing transactions, database connections, and servers. FIG. 3 is a flow diagram that illustrates a process for generating and storing a unique transaction identifier for the transaction in association with the storing of the database connection, in one embodiment. In one embodiment, the transaction management system 140 (FIG. 1) can be programmed to execute the process of FIG. 3.

At block 310, the process is programmed to generate a unique transaction identifier for a transaction, typically at the time that a database connection is stored, for example, near in time to block 220 of FIG. 2. A unique transaction identifier can comprise a randomly or pseudorandomly generated integer, alphanumeric character sequence, byte sequence, or a bit sequence, alone or in combination with a date or time value, information relating to the data access process, server to service requests, and/or database connection. For example, the unique transaction identifier may comprise a location identifier such as a network address of the server in data access process 140 that initiates a database connection. In an embodiment, the unique transaction identifier may comprise an IP address of the server, alone or in combination with one or more of the values specified above.

At block 320, the process is programmed to store the unique transaction identifier for the transaction, for example, in association with the storing of the database connection. In one embodiment, the transaction management system 140 may comprise memory or non-volatile storage capable of storing transaction identifiers for thousands to millions of transactions. Storage can occur transiently in the main memory of a computer that implements the transaction management system 140 and identifiers can be deleted or overwritten when a transaction closes. Alternatively, identifiers of transactions can be stored persistently in a database for audit, logging, archive, or performance monitoring purposes.

At block 330, which can be executed asynchronously and/or at a different point in time compared with block 310, 320, the process is programmed to parse a particular transaction identifier that has been received in connection with each of the plurality of REST queries initiated by the browser process (FIG. 2). For example, block 330 can be executed just after block 230 in connection with processing an inbound query from the browser process, browser device 110, or another client.

TABLE B is an example of library code programmed for parsing transaction identifiers that the transaction management process may be programmed to implement in the SPRING BOOT environment.

TABLE B

Parsing Transaction Identifier Library Code Example

```
@Configuration
@ComponentScan({"com.xactly.rest.transaction.manager.rest"})
public class Restconfig {
    @Bean
    public TransactionalResourceInterceptor getTransactionIdReader( ) {
        return new TransactionalResourceInterceptor("TransactionId");
    }
    @Bean
    public MappedInterceptor transactionIdInterceptor
    (TransactionalResourceInterceptortransactionalResourceInterceptor) {
        return new MappedInterceptor(new String[ ]("/books/**"),
        transactionalResourceInterceptor);
    }
}
```

The example library of TABLE B implements a Spring Handler Interceptor to intercept specified endpoints and read the transaction identifier from the header of a REST request. In an embodiment, the interceptor can be defined by TransactionalResourceInterceptor.class. The name of the transaction identifier header can be defined in the constructor of TransactionalResourceInterceptor.class. One or more transactional endpoints can be defined by MappedInterceptor.class.

At block 340, the process is programmed to test whether the particular transaction identifier of a particular received REST query matches the stored unique transaction identifier for the transaction. The test of block 340 recognizes that REST queries are received asynchronously via a sessionless transport protocol, so any given inbound REST query may or may not be associated with a known transaction. Furthermore, some queries may reference resources that the data access system 140 manages, and others may implicate resources elsewhere, requiring proxy service for those resources.

If the test of block 340 is positive, TRUE, or YES, then control transfers to block 350. A block 350, when the particular transaction identifier of the particular REST query among the plurality of REST queries matches the unique transaction identifier, the process is programmed to forward that particular REST query to the data access process. In an embodiment, the transaction management process forwards the particular REST query to the same single server that started the transaction using an IP address in the header of the particular REST query and matching an IP address of the server node.

Alternatively, if the test of block 340 is negative, FALSE, or NO, then at block 360, the process is programmed to proxy the particular REST query to a particular server process among the cluster of computer-executed server processes. In an embodiment, proxying at block 360 further comprises determining whether the particular transaction identifier of a particular REST query matches another unique transaction identifier of another particular server node. If the identifiers match, the transaction management process forwards the particular REST query to the other server node; if the identifiers don't match any stored transaction identifiers, then the transaction management process forwards the particular REST query to a randomly or pseudorandomly selected server process among the cluster of computer-executed server processes.

In an embodiment, each transaction identifier corresponds to a specified endpoint, such as one of the server processes among the cluster of computer-executed server processes, and the transaction identifier can comprise a network address of the endpoint. For example, the database connection may be a Transmission Control Protocol (TCP) connection which forces that REST request to be processed by the same server by routing requests to a consistent TCP port. For example, the interceptor code of TABLE B illustrates proxying a REST request to a consistent node. In some embodiments, the transaction identifier contains an IP address of the node where the transaction started.

In an embodiment, to store a database connection in an open state and prevent committing a transaction before executing all the REST queries of the transaction, a connection interface can be programmed to implement a wrapper function that intercepts calls to commit a transaction and defers executing a commit until all queries of the transaction have been processed. For example, TABLE C illustrates a program for wrapping a transaction in Spring Boot environment using a Connection.commit function.

TABLE C

Wrapping Connection Library Code Example

```
@Configuration
public class DataSourceConfig {
    @Bean
    public DataSource getDataSource(DataSourceProperties properties,
                                    TransactionalResourceInterceptor
    transactionalResourceInterceptor) {
        final var datasource = properties.initializeDataSourceBuilder( ).
    build( );
        return new RTMDataSource(
            datasource,
            transactionalResourceInterceptor::getTransactionId
        );
    }
}
```

In this embodiment, RTMDataSource.class is used to wrap a data source and execute a commit or rollback only when all queries have been processed for a transaction. Queries of transactions may also result in exceptions. TABLE D is an example exception handling library that the transaction management process may be programmed to implement.

TABLE D

Exception Handling Library Code Example

```
@ControllerAdvice
public class ErrorHandler {
    @ExceptionHandler(RTMTransactionNotFoundException.class)
    public ResponseEntity<String> databaseError
    (RTMTransactionNotFoundException e) (
        return ResponseEntity
            .badRequest( )
            .body(e.getMessage( ) ) ;
    }
}
```

In some embodiments, end transaction endpoint and REST queries endpoints may return a bad request exception, for example, when the transaction identifier cannot be successfully parsed. Or, a transaction could be closed before all the REST queries are executed. In an embodiment, the transaction management process can be programmed to output, for example, RTMTransactionNotFoundException.

In a REST response, an implementation may use the Spring annotation @ExceptionHandler.

Figure 4:
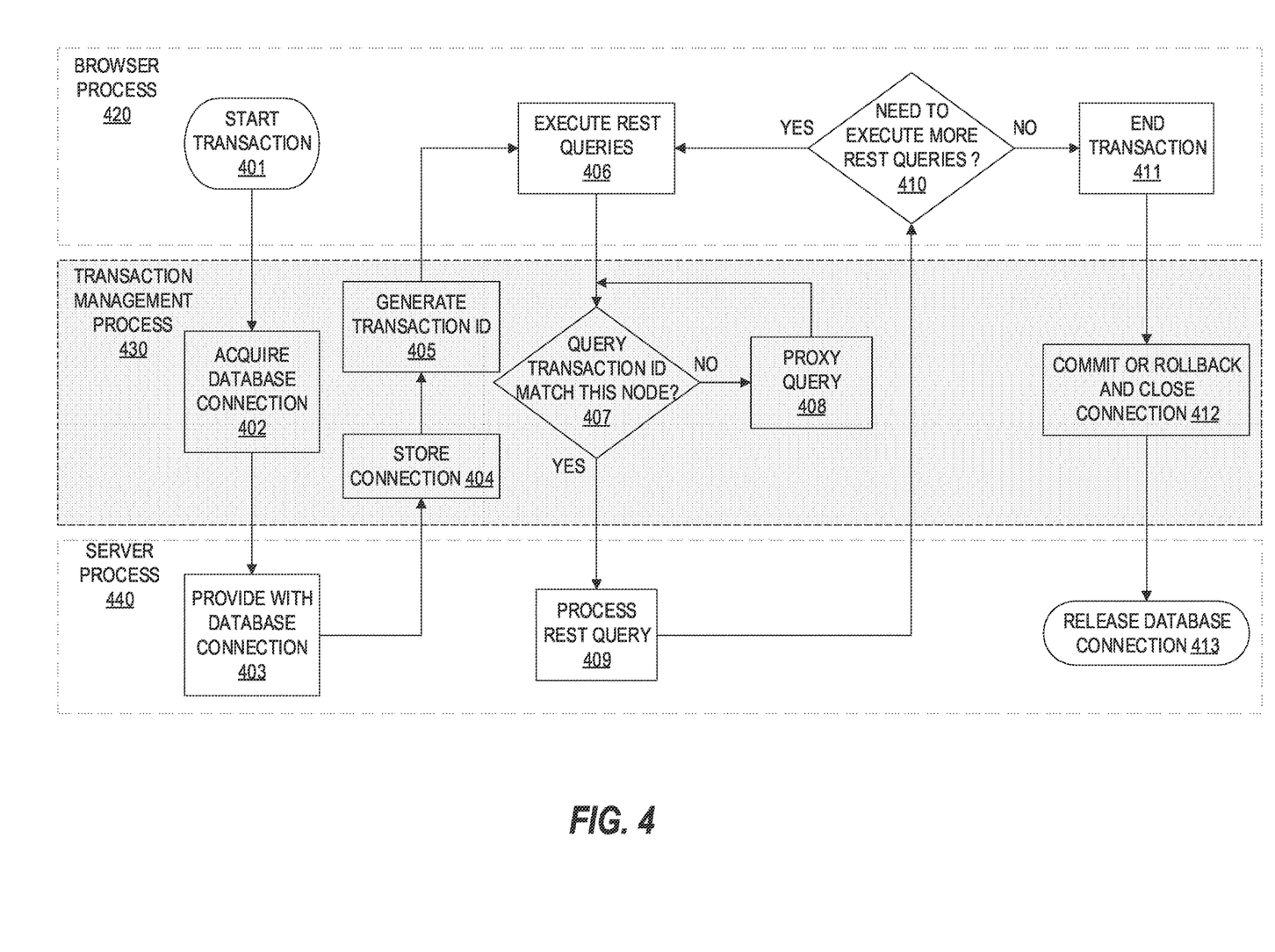
FIG. 4 is a flow diagram that illustrates processing and generating results in response to a client-initiated start transaction request, in an embodiment.

FIG. 4 is a flow diagram that illustrates executing multiple REST queries and managing the execution of the multiple queries in a single transaction, in an embodiment. FIG. 4 focuses on operations executed using functional elements such as a browser process 420, transaction management process 430, and server process 440.

At step 401, a browser process 420 at a client terminal generates a first REST request associated with starting a transaction and sends the request to the transaction management process 430 to declare the initiation of a transaction. Once the transaction management process 430 receives the first REST request, the transaction management process 430 acquires a database connection from a server process 440 at step 402. At step 403, in response to the transaction management process 430 acquiring the database connection, the server process 440 provides the transaction management process 430 with the database connection.

At step 404, the transaction management process 430 stores the database connection and maintains the database connection in an open state. At step 405, once the database connection has been established, the transaction management process 430 generates a unique transaction identifier for the transaction in association with the storing of the database connection with the server process 440 and stores the unique transaction identifier.

At step 406, while the database connection is kept open by the transaction management process 430, the browser process 420 sends multiple REST queries for execution to the transaction management process 430. In response to receiving multiple REST queries for execution, the transaction management process 430 parses each of the REST queries and obtains a particular transaction identifier of each REST queries to be executed.

At step 407, the transaction management process 430 determines whether the particular transaction identifier of each particular REST query among the multiple REST queries matches the unique transaction identifier stored with the server process 440 at step 405. When a match is found, the transaction management process 430 forwards the particular REST query to the server process 440 for processing. When the particular transaction identifier does not match, the transaction management process 430 proxies that particular REST query to a particular server process among the cluster of computer-executed server processes.

At step 409, the server process 440 processes the multiple REST queries with the matching transaction identifiers and forward responses to the multiple REST queries with the matching transaction identifiers and the database connection remains in the open state.

At step 410, the browser process 420 determines whether all the REST queries have been executed. When there is a need to execute more REST queries, steps 406-409 are repeated until all the REST queries have been processed. When there is no need to execute any more REST queries, the browser process 420 generates a second REST request, associated with ending the transaction and sends that request to the transaction management process 430 to declare the termination of the transaction. In response, the transaction management process 430 closes the database connection at step 412. At step 412, the process further comprises committing the transaction with the database via the server process 440 or rolling back the transaction with the database via the server process 440.

At step 413, in response to the transaction management process 430 closing database connection, the server process 440 releases the database connection with the transaction management process 430.

TABLE E illustrates an example of browser-executed code to implement client-side functions of the processes that have been previously described. In the embodiment of TABLE E, JAVASCRIPT code allows clients to manage multiple REST resources in a single transaction using the Java Spring environment with Spring Boot.

TABLE E

JavaScript Client Code Example

```
console.log('App started') ;
class Transaction {
   static startTransaction( ) {
      return window
         .fetch(this.baseUrl, {method: 'POST'})
         .then(response => {
            if (!response.ok)
               throw new Error(response, body);
            return response.headers.get('Location').substring
(this.baseUrl.length + 1);
         });
   }
   static commitTransaction(transactionId) {
      return this._endTransaction(transactionId, 'COMMIT');
   }
   static rollbackTransaction( ) {
      return this._endTransaction(transactionId. 'ROLLBACK');
   }
   static _endTransaction (transactionId, method) {
      return window
         .fetch ( ' $(this.baseUrl)/$(transactionId)', {
            method: 'DELETE',
            headers: {'Content-Type': 'text/plain'},
            body.method
         ])
         .then (response => {
            if (!response.ok)
               throw new Error(response.body);
         });
   }
}
Transaction.baseUrl = 'http://localhost:8080/transactions';
class Book (
   static loadBooks(transactionId) {
      const headers = { };
      if (transactionId !== undefined)
         headers ['TransactionId'] - transactionId,
      return window
         .fetch(this.baseUrl, (headers;})
         .then {response => [
            if (!response.ok)
               throw new Error(response.body);
            return response.json( ) ;
         });
   }
   static createBook(book, transactionId) {
      const headers = {
         'Content-Type': 'application/json'
      };
      if (transactionId !== undefined)
         headers ['TransactionId' ] = transactionId;
      return window
         .fetch(this.baseUrl, [
            method: 'POST',
            headers,
            body: JSON. stringify (book)
         })
         .then(response => {
            if (!response.ok)
               throw new Error(response.body);
            return response.json( );
         });
   }
}
```

TABLE E-continued

JavaScript Client Code Example

```
Book.baseUrl = 'http://localhost:8080/books';
Transaction.startTransaction( )
    .then(transactionId => {
        console.log("transactionId:", transactionId);
        return Book.createBook({name: 'MyBook'}, transactionId)
            .then(book => {
                console.log("created book:", book);
                return'Book.loadBooks (transactionId);
            })
            .then(books => {
                console.log("Books within transaction:", books);
                return Book.loadBooks( ) ;
            })
            .then(ooks => {
                console.log("Books out of transaction:", books);
                return Transaction.commitTransaction(transactionId);
            });
    })
    .then( ( ) => {
        console.log("Committed");
        return Book.loadBooks( );
    })
    .then(books => {
        console.log("Committed Books:", books);
    })
    .catch(err => {
        console.log(err);
    });
```

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
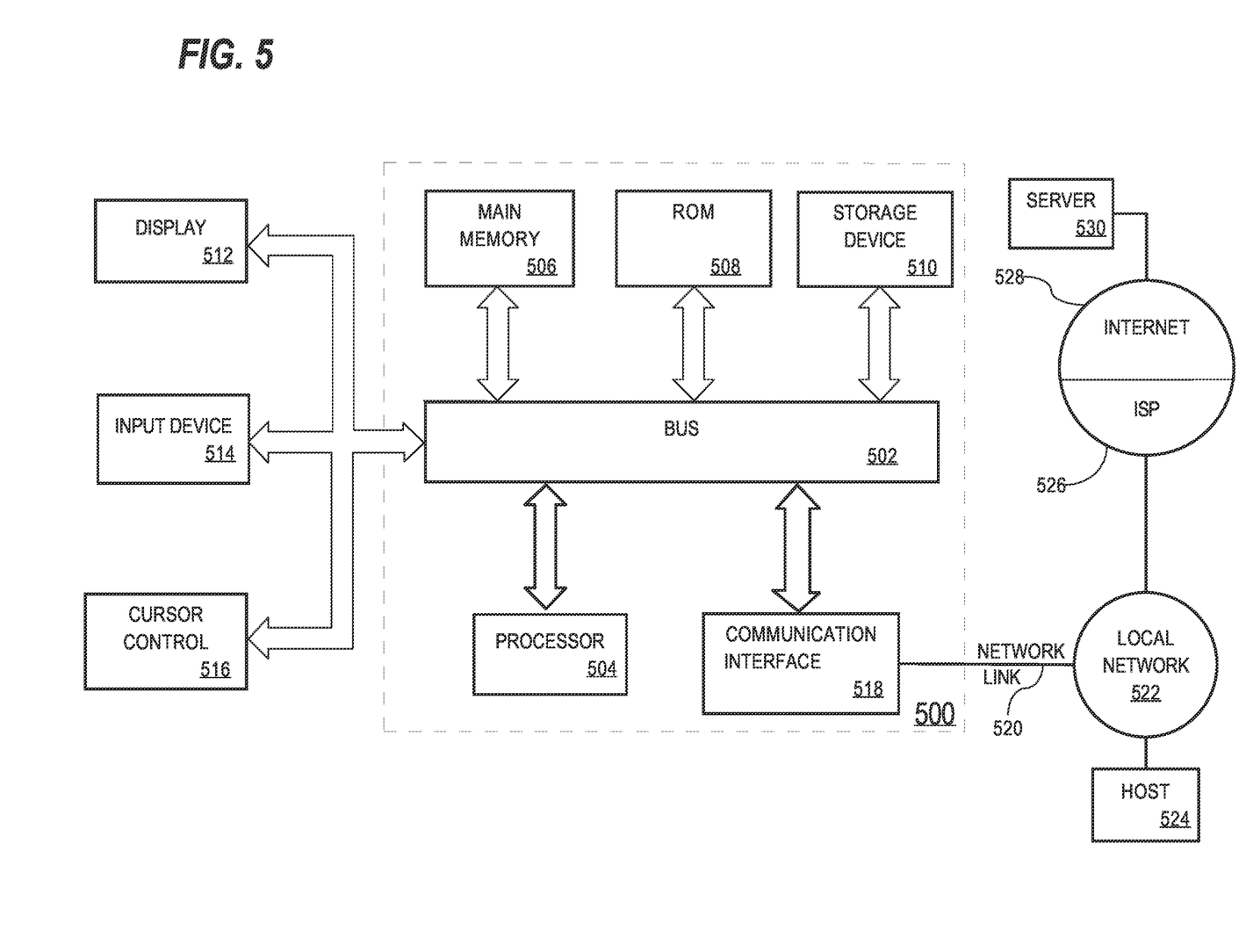
FIG. 5 is a block diagram that illustrates a computer system upon which an embodiment could be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   using a transaction management process that is communicatively coupled to a cluster of computer-executed server processes, receiving from a browser process a first request to start a transaction associated with a data access process, the data access process implementing representational state transfer (REST) and being communicatively coupled to a database, the data access process implementing a plurality of REST resources that are capable of invocation via queries;
   using the transaction management process, acquiring a database connection from the data access process and storing the database connection in an open state;
   using the transaction management process, generating and storing a unique transaction identifier for the transaction in association with the storing of the database connection at a first point in time;
   using the transaction management process, receiving from the browser process a plurality of REST queries via a sessionless transport protocol for execution;
   using the transaction management process, and while the database connection is in the open state, programmatically forwarding the plurality of REST queries to the data access process based on each particular transaction identifier parsed by the transaction management process for each of the plurality of REST queries, determining that, for at least one of the plurality of REST queries, the corresponding parsed transaction identifier does not match the unique transaction identifier, and in response to the determination, proxying the at least one of the plurality of REST query to a particular server process among the cluster of computer-executed server processes;
   using the transaction management process, and while the database connection is in the open state, programmatically forwarding responses from the data access process to the browser process;
   using the transaction management process, receiving a second request from the browser process to end the transaction, and only in response to the second request, programmatically completing the transaction in communication with the data access process, and changing the database connection to a closed state;
   the method being executed using one or more computing devices.

2. The method of claim 1, the forwarding steps further comprising:
   determining that, for at least one of the plurality of REST queries, the corresponding parsed transaction identifier matches the unique transaction identifier, and in response to the match, forwarding that particular REST query to the data access process.

3. The method of claim 1, the data access process being configured to execute as a particular server process among the cluster of computer-executed server processes.

4. The method of claim 2, the particular transaction identifier corresponding to a specified endpoint, the endpoint being one of the server processes among the cluster of computer-executed server processes, the particular transaction identifier comprising a network address of the endpoint.

5. The method of claim 1, the completing the connection further comprising committing the transaction with the database via the data access process.

6. The method of claim 1, the completing the connection to further comprising rolling back the transaction with the database via the data access process.

7. One or more non-transitory computer-readable storage media storing one or more sequences of instructions which, when executed using one or more processors, cause the one or more processors to execute:
   using a transaction management process that is communicatively coupled to a cluster of computer-executed server processes, receiving from a browser process a first request to start a transaction associated with a data access process, the data access process implementing representational state transfer (REST) and being communicatively coupled to a database, the data access process implementing a plurality of REST resources;

using the transaction management process, acquiring a database connection from the data access process and storing the database connection in an open state;

using the transaction management process, generating and storing a unique transaction identifier for the transaction in association with the storing of the database connection at a first point in time;

using the transaction management process, receiving from the browser process a plurality of REST queries via a sessionless transport protocol for execution;

using the transaction management process, and while the database connection is in the open state, programmatically forwarding the plurality of REST queries to the data access process based on each particular transaction identifier parsed by the transaction management process for each of the plurality of REST queries, determining that, for at least one of the plurality of REST queries, the corresponding parsed transaction identifier does not match the unique transaction identifier, and in response to the determination, proxying the at least one of the plurality of REST query to a particular server process among the cluster of computer-executed server processes;

using the transaction management process, and while the database connection is in the open state, programmatically forwarding responses from the data access process to the browser process;

using the transaction management process, receiving a second request from the browser process to end the transaction, and only in response to the second request, programmatically completing the transaction in communication with the data access process, and changing the database connection to a closed state.

8. The non-transitory computer-readable storage media of claim 7, the instructions which when executed cause the forwarding further comprising one or more sequences of instructions which, when executed using the one or more processors, cause the one or more processors to execute:

determining that, for at least one of the plurality of REST queries, the corresponding parsed transaction identifier matches the unique transaction identifier, and in response to the match, forwarding that particular REST query to the data access process.

9. The non-transitory computer-readable storage media of claim 7, the data access process being configured to execute as a particular server process among the cluster of computer-executed server processes.

10. The non-transitory computer-readable storage media of claim 8, the transaction identifier corresponding to a specified endpoint, the endpoint being one of the server processes among the cluster of computer-executed server processes, the transaction identifier comprising a network address of the endpoint.

11. The non-transitory computer-readable storage media of claim 7, the instructions which when executed cause completing the connection further comprising one or more sequences of instructions which, when executed using the one or more processors, cause the one or more processors to execute committing the transaction with the database via the data access process.

12. The non-transitory computer-readable storage media of claim 7, the instructions which when executed cause completing the connection further comprising one or more sequences of instructions which, when executed using the one or more processors, cause the one or more processors to execute rolling back the transaction with the database via the data access process.

* * * * *